May 7, 1935.   B. L. MALLORY   2,000,086
SHOCK ABSORBER
Filed Aug. 7, 1933
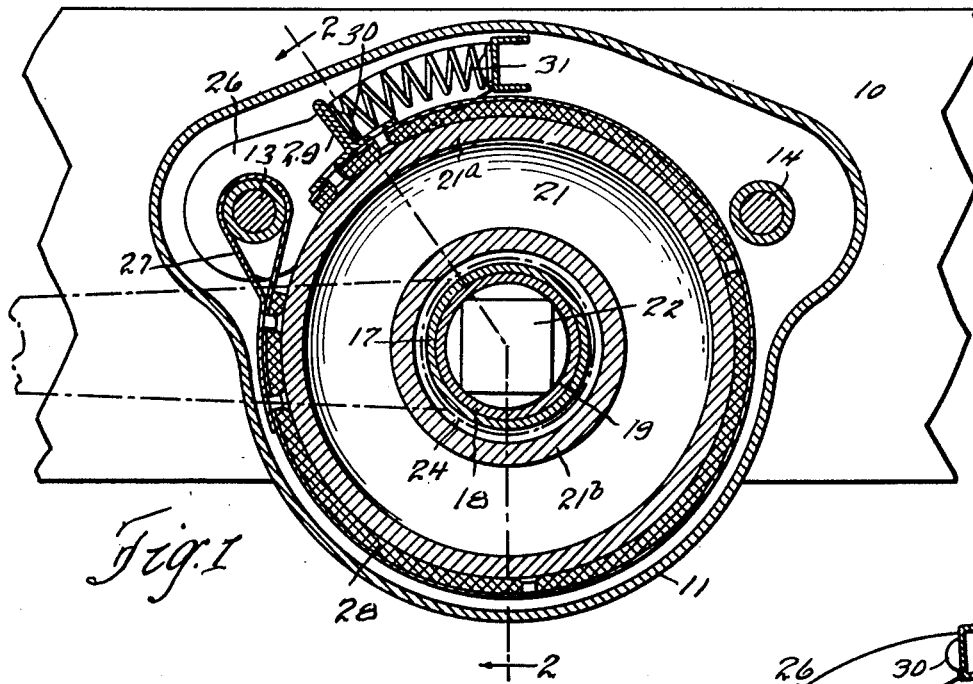
Fig. 1
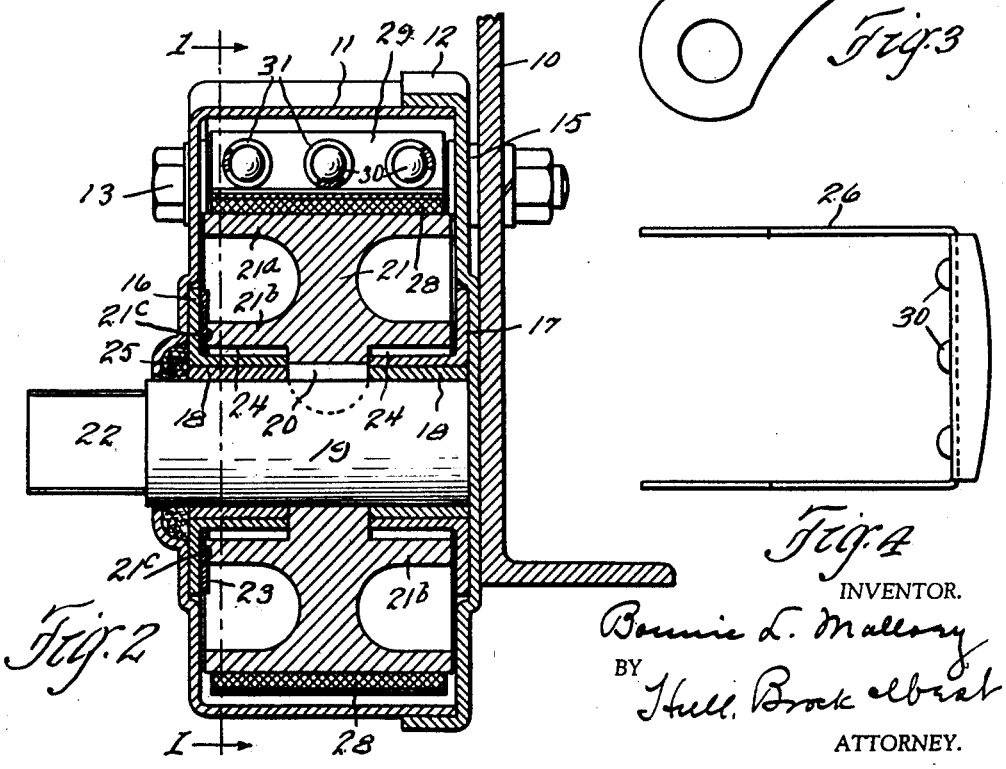
Fig. 2   Fig. 3
Fig. 4
INVENTOR.
Bonnie L. Mallory
BY Hull, Brock Albert
ATTORNEY.

Patented May 7, 1935

2,000,086

UNITED STATES PATENT OFFICE 2,000,086

SHOCK ABSORBER

Bonnie L. Mallory, Cleveland, Ohio, assignor to Gadget's Inc., Cleveland, Ohio, a corporation of Ohio Application August 7, 1933, Serial No. 683,982

3 Claims. (Cl. 188—130)

This invention relates to a shock absorber of the arm type and has for its principal object to produce in a shock absorber of this type and with the simplest and most inexpensive mechanism a controllable differential snubber effect.

Other and more limited objects will become apparent from the following description when taken in connection with the accompanying drawing in which Fig. 1 is a sectional view taken parallel to the vehicle frame upon which the device is to be mounted and corresponding substantially to the line 1—1 of Fig. 2; Fig. 2 is a section on the line 2—2 of Fig. 1 and Figs. 3 and 4 are detail views of a yoke member forming a portion of the spring anchorage.

Referring now to the drawing, the numeral 10 indicates the frame member of a vehicle, such as an automobile, to which my improved shock absorber is adapted to be attached. The snubbing mechanism proper is enclosed within a housing made up of a shell 11 and a cover 12 telescoping thereover. The housing is connected to the frame member 10 by means of bolts 13 and 14 extending integrally through the housing and through said frame member. Between the frame member 10 and the housing cover 12 is a member 15 which may be a washer but preferably is a nut threaded upon the end of the bolt whereby to hold the housing in assembled relation when it is not attached.

Attached to the housing members 11 and 12 respectively are bearing members 16 and 17 each consisting of a cylindrical portion within which is received a bushing 18 and a flange portion which is connected to the housing member by spot welding or other suitable means.

Journaled within the bushings 18 is a shaft 19 to which is keyed, as indicated at 20, a drum member 21. The shaft 19 terminates in a polygonal portion 22 to which an arm is adapted to be connected. The arm is indicated in dot and dash lines in Fig. 1. The drum member 21 may be a casting provided with a cylindrical drum surface 21ª and sealing cylindrical flanges 21ᵇ concentric with the drum surface 21ª. The ends of the flanges 21ᵇ are preferably provided with grooves 21ᶜ between which and the flanges of the members 16 and 17 are positioned deformable sealing washers 23. Only one of the flanges 21ᵇ is shown as being provided with sealing grooves 21ᶜ and washers 23 but it is to be understood that the other said flange will be similarly equipped in the preferred form. With these sealing washers in position, grease may be packed into the spaces 24 and 25 without danger of leaking into the housing where it would come into contact with the friction surface of the drum. Any suitable means (not shown) may be provided for preventing the escape of lubricant from the space 25 around the shaft 19.

Received on the bolt 13 is a U-shaped yoke 26 and the folded over end of a metallic strip 27 which together with a friction liner 28 makes up a friction band adapted to contact the drum surface 21ª. This friction band extends around the drum 21 and terminates in an abutment 29 consisting of a T-shaped member riveted to the metal strip 27 and provided with projections 30 which may be struck out of the metal or otherwise provided. The yoke member 26 is pivotally engaged on the bolt 13 whereby it may be rotated away from the drum enough to allow the abutment 29 to be moved into the space between its arms. A plurality of springs 31 are interposed between the bight portion of the yoke 26 and the abutment 29, its open ends being received on the projections 30.

From the foregoing, it will be seen that when the arm rotates in a counter clockwise direction as seen in Fig. 1 both the friction between the friction band and drum 21 and the resiliency of the springs 31 will tend to tighten the friction band whereby to increase the snubbing effect and that when the arm is rotated in the opposite direction, the resiliency of the springs will tend to tighten the friction band while the force of friction tends to loosen it. The result is that by properly selecting the strength and number of springs, it is possible to secure within desirable limits any ratio of "up" and "down" snubbing effect.

It will thus be clear that by the use of very simple mechanism, I have produced an arm snubber which is well adapted for its intended purpose and quite flexible as to snubbing effect and differential between up and down strokes. While I have shown and described the preferred embodiment of my invention, I wish it understood that I am not limited to details thereof but only in accordance with the appended claims and the prior art.

Having thus described my invention, what I claim is:

1. In a device of the class described, a housing, a drum journaled therein and having a shaft extending therefrom for receiving an arm, a bolt extending through said housing, a yoke member having its ends received on said bolt, a friction band connected to said bolt, wound around said drum and provided with an abutment received within said yoke, and compression spring means interposed between said abutment and the bight portion of said yoke.

2. In a device of the class described, a housing, a drum journaled therein and having a shaft extending therefrom for receiving an arm, a bolt extending through said housing, a yoke member having its ends pivotally received on said bolt, a friction band connected to said bolt, wound around said drum and provided with an abutment adapted to be received within said yoke, and compression spring means interposed between said abutment and the bight portion of said yoke.

3. In a device of the class described, a housing, a drum journaled therein and having a shaft extending therefrom for receiving an arm, a bolt extending through said housing, a yoke member having its ends pivotally received on said bolt, a friction band connected to said bolt, wound around said drum and provided with an abutment adapted to be received within said yoke, and compression spring means interposed between said abutment and the bight portion of said yoke, said spring means comprising a plurality of coiled compression springs, and said abutment and said bight portion being provided with projections adapted to enter the ends of such springs.

BONNIE L. MALLORY.